3,281,411
PROCESS FOR THE MANUFACTURE OF
STARCH DERIVATIVES
José Thérèse Lemmerling, Edegem, Belgium, assignor to Gevaert Photo-Producten, N.V., Mortsel, Belgium, a company of Belgium
No Drawing. Filed Sept. 18, 1962, Ser. No. 224,554
Claims priority, application Germany, Nov. 2, 1961, G 33,484
1 Claim. (Cl. 260—233.5)

This invention relates to a process for the manufacture of starch derivatives.

It is known to use starch and starch derivatives on a large scale in the industry for instance in paper making, in the textile industry as sizing agent, as adhesive, etc.

Starch is found in nature in the form of microscopic grains which, according to their origin, widely vary in size and form. The grains of maize starch for instance have a diameter of 5–25 $\mu$, those of rice starch 3–8 $\mu$, those of wheat starch 2–10 $\mu$ and 20–35 $\mu$, those of potato starch 15–100 $\mu$ and those of barley starch 2–6 $\mu$ and 20–35 $\mu$. During the chemical treatment of the starch derivative the granular form is lost by gelatinization. It is, however important, for certain applications that this granular form be maintained and moreover that the hydrophilic character of the starch grains be decreased as much as possible.

It is known to acetylate starch by activating the starch grains beforehand for about 1 h. with pyridine at reflux temperature (115° C). During the acetylation, the starch grains swell considerably which facilitates further esterification. The starch derivative finally dissolves in the pyridine. The granular form can be maintained by partially replacing the pyridine by heptane and diamylether. In this case, however, much longer reaction times are required and there has still to be taken into account of the strong swelling of the starch grain (J. Am. Chem. Soc. 72 (1950) 4298).

A process has now been found for manufacturing in one step hydrophobic grains of starch derivatives. According to this process starch is treated at 50–75° C. with a mixture consisting of an organic acid, an organic acid chloride or acid anhydride and an esterification catalyst in the presence of an organic liquid which is inert with regard to the starch derivative to be formed, whereupon the starch derivative is separated and dried.

Before the treatment, the starch is dried since the moisture content of the starch influences the esterification reaction. In the process according to the invention it is preferably to esterify starch having a moisture content of 5–15% by weight. Starch which has been dried in vacuum at 105° C. does not react or reacts too slowly to be useful.

In order to facilitate the esterification reaction, the dried starch grains are allowed to swell for a defined time in an organic acid at room temperature, whereupon the excess of acid is removed, for instance by suction. The actual esterification takes place at temperatures varying between room temperature and the boiling point of the used inert liquid. It, however, preferably takes place between 50 and 75° C.

All known esterification catalysts can be used such as sulfuric acid, zinc chloride, perchloric acid etc. Sulfuric acid, however, is preferably used in a concentration of about 4–5 parts by weight of sulfuric acid per 100 parts of starch.

In the process according to the invention acetic acid, propionic acid, butyric acid etc. can be used as organic acid, together with their respective acid anhydrides or acid chlorides. Single esters, using one acid anhydride or acid chloride as well as mixed esters, using two or more acid anhydrides or acid chlorides can be obtained. The organic liquid which is present according to the process of the invention must be inert with regard to the starch ester formed. Aromatic hydrocarbons such as benzene, xylene, toluene and high-boiling ethers such as diisopropyl ether can be used. The proportion by weight of the total amount of liquid to the amount of solid substance in the reaction medium is preferably kept at 15:1. This proportion, however, is not critical: it may be higher or lower according to the aimed purpose and used reagents.

After the reaction, the product obtained is washed, separated according to known methods for instance by suction, and then dried according to known methods; for instance in an air current.

Besides the above-mentioned kinds of starch the following varieties can also be used: starch from tapioca, sago, sweet potatoes or batatas etc., further: amylose, amylopectin, partially degraded starch such as white and yellow dextrine etc.

The hydrophobic grains of starch derivatives formed according to the invention are widely applied, especially in the photographic industry. In the first place they can be used in the application of mat and rough layers. These layers can be intended for obtaining special photographic effects for instance with positive images to be viewed by reflection on paper, film or glass or for facilitating certain photographic treatments for instance retouching. In this case grains of starch derivatives are used the diameter of which is at most 30 $\mu$ but preferably below 10 $\mu$. Such grains can also be used for applying covering layers upon photographic material in order to impart to this material an increased resistance to scratching. In this case the layers are normally thinner than the average grain size so that the grains protrude from the layer and protect much better the underlying material. Since in this case the contact and friction between consecutive layers of a wound up photographic material are not as pronounced as might be expected because of the presence of grains of starch derivative, a decrease of the static charging of this material is obtained.

The following examples illustrate the present invention.

EXAMPLE 1

*Rice starch acetate*

In a three-necked flask of 500 cm.³, 150 cm.³ of xylene, 100 cm.³ of acetic anhydride and 40 cm.³ of acetic acid are brought at 50° C. To this mixture are added 0.5 cm.³ of chemically pure sulfuric acid and 20 g. of rice starch, which have been dried for 2 h. at 60° C. The acetylation proceeds for 6 h. at 50° C.

The reaction mass is poured into 2 l. of ethanol whereupon the suspension thus obtained is sucked off. The rice starch acetate separated is twice washed with ethanol. Thereupon the product is stirred for further 3 h. in 100 cm.³ of a mixture consisting of 90 parts of ethanol and 10 parts of saturated aqueous sodium acetate. After sucking off, the derivative is still washed twice with ethanol and dried by an air current at 40° C. The substitution degree of acetyl groups amounts to 1, which corresponds with 21.2% of acetyl groups. The obtained hydrophobic grains of rice starch acetate have an average diameter of 6 $\mu$.

EXAMPLE 2

*Amylopectine acetate*

In a three-necked flask of 2 liter, 50 g. of dried amylopectine (grain size: 50 $\mu$) are allowed to swell for 24 h. at room temperature in 750 cm.³ of acetic acid and 3 cm.³ of N sulfuric acid. After suction till 250 cm.³ (200 g. of acetic acid) is left, an acetylation mixture is added which consists of 750 cm.³ of xylene, 500 cm.³ of acetic anhydride and 15 cm.³ of chemically pure sulfuric acid. The reaction proceeds for 5 h. at 40° C. Thereupon a mixture of 200 cm.³ of acetic acid and 100 cm.³ of water are added to the reaction mixture. The precipitate obtained is sucked off, washed with ethanol and stabilized with sodium acetate for 3 h., in a mixture of acetone and water (1:1). The product is poured into ethanol and washed. The substitution degree of acetyl groups amounts to 0.42.

EXAMPLE 3

*Amylose acetate*

This product is obtained analogously to Example 2 starting from dried amylose (grain size: about 50 μ). The substitution degree of acetyl groups amounts to 0.35.

EXAMPLE 4

*Maize starch butyrate*

In a three necked flask of 1 liter are successively brought 50 g. of maize starch (dried for 2 h. at 80° C.), 250 cm.³ of anhydrous xylene and 190.9 cm.³ of butyric anhydride. Thereupon a mixture of 100 cm.³ of acetic acid and 0.5 cm.³ of chemically pure sulfuric acid is added and the reaction mass is allowed to react for 17 h. at 70° C. The reaction mass is poured out into ethanol and the precipitate formed is sucked off and washed twice in ethanol. Then the product is stirred for 3 h. in a mixture of 100 cm.³ of ethanol and 10 cm.³ of saturated aqueous sodium acetate. The derivative is washed twice with ethanol and once with acetone. Finally the product is dried at room temperature in an air current. The substitution degree amounts to 1.2 which corresponds with 30.6% of butyryl groups. The obtained grains of starch butyrate have an average size of about 20 μ.

EXAMPLE 5

*Maize starch stearate*

In a three-necked flask of 1 liter are successively brought: 20 g. of maize starch (dried for 2 h. at 80° C.), 200 cm.³ of anhydrous xylene, 100 cm.³ of acetic acid and 0.5 cm.³ of chemically pure sulfuric acid. After bringing the reaction mixture at 70° C., 149.36 g. of stearoyl chloride are added and the reaction mass is allowed to react at 70° C. for 18 h. The example is then further carried out as in Example 4. The substitution degree amounts to 1.5 which corresponds with 71.3% of stearoyl groups. The formed grains of starch stearate have an average size of about 20 μ.

I claim:

A process for the manufacture of hydrophobic grains of a starch derivative comprising treating starch grains with a mixture consisting of a saturated monocarboxylic organic acid having from 2 to 4 carbon atoms, and a member selected from the group consisting of a saturated monocarboxylic acid anhydride and a saturated monocarboxylic acid chloride with 2 to 16 carbon atoms, and an esterification catalyst in an organic liquid which is inert with regard to the starch derivative to be formed, the reaction taking place at a temperature in the range of from 50 to 75° C. and thereby forming a substantially hydrophobic starch derivative having a degree of substitution of 1.5 or less, and separating, recovering and drying the starch derivative in granular form.

References Cited by the Examiner

UNITED STATES PATENTS

| 2,028,761 | 1/1936 | Dreyfus et al. | 260—229 |
| 2,627,516 | 2/1953 | Lohmar | 260—233.5 |
| 2,860,132 | 11/1958 | White et al. | 260—227 |
| 2,891,947 | 6/1959 | Paschall et al. | 260—233.5 |
| 2,914,526 | 11/1959 | Paschall | 260—233.5 |

OTHER REFERENCES

Kerr, R. W.: Chemistry and Industry of Starch, N.Y., Academic Press Inc. (1950), pages 267–269 relied on.

LEON J. BERCOVITZ, *Primary Examiner.*

JAMES A. SEIDLECK, LOUISE P. QUAST, *Examiners.*

E. EDWARDS, R. W. MULCAHY, *Assistant Examiners.*